H. WALDSCHMIDT.
LANTERN HOLDER.
APPLICATION FILED FEB. 24, 1908.
991,914.
Patented May 9, 1911.
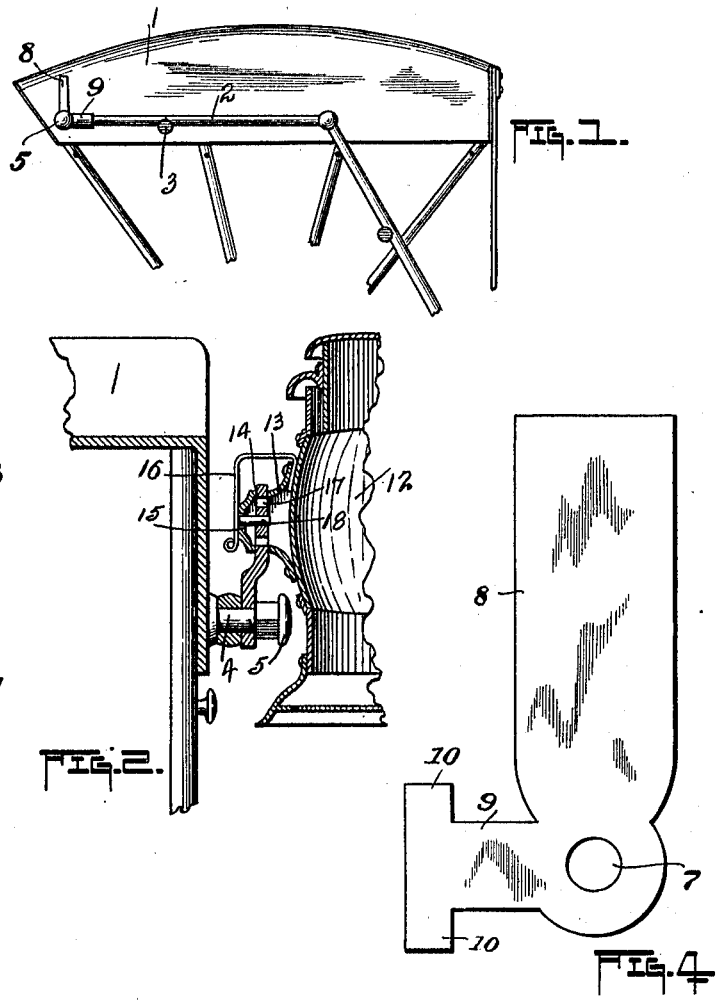

UNITED STATES PATENT OFFICE.

HENRY WALDSCHMIDT, OF BENSON, ILLINOIS.

LANTERN-HOLDER.

991,914.

Specification of Letters Patent.

Patented May 9, 1911.

Application filed February 24, 1908. Serial No. 417,325.

*To all whom it may concern:*

Be it known that I, HENRY WALDSCHMIDT, a citizen of the United States, residing at Benson, in the county of Woodford and State of Illinois, have invented certain new and useful Improvements in Lantern-Holders; and I do hereby declare that the following is a full, clear, and exact description of the invention, which will enable others skilled in the art to which it appertains to make and use the same.

This invention has reference to certain new and useful improvements in lamp supports or holders for vehicles and has special reference to a lamp holder capable of being attached to the forward ends of the -side braces extending longitudinally along the sides of the top of a buggy or similar vehicle.

One of the objects of the present invention, is a lamp holder or support consisting of a bracket adapted to be secured to the forward end of the top side brace of a buggy or similar vehicle, and having a portion serving to support a lamp and provided with an extension extending for a suitable distance parallel with the brace and provided with securing means for clamping the same to the brace.

The invention has for its further object, a lamp support which is bent into form from a single piece of sheet metal and when so formed, provided with a support for sustaining a lamp therefrom, and with securing means for fastening the said support to suitable parts of a buggy or other vehicle.

The invention has for a further object, a lamp support for vehicles and securing means in connection with a lamp for securing said lamp to the said support, said support provided with an upright having one or more perforations and the lamp having secured thereto a spring clip having a stud adapted for engagement with the perforations of the upright of said support.

A further object of the invention, is a lamp support having connection with the forward portion of the horizontal braces disposed along the sides of the top of the buggy or similar vehicle, which said support may have a detachable relation with said brace by being secured on the threaded stud supporting the forward end of the brace.

For a further and full description of the invention and the merits thereof and also to acquire a knowledge of the details of construction of the means for effecting the result, reference is to be had to the following description and drawings hereto attached, in which:—

Figure 1 is a greatly reduced side elevation of the top portion of a buggy showing the application of one form of the invention to the longitudinal top brace thereof; Fig. 2 is an enlarged partial vertical section of the top portion of one side of a buggy showing the manner of attaching a modified form of my lamp support thereto, and the means employed for connecting a lamp to said support, said lamp being partially shown and in vertical cross section; Fig. 3 is a detail perspective view looking at the rear side of my lamp support when the same is formed from sheet metal. Fig. 4 is an enlarged plan view of a sheet metal blank preparatory to bending the same into the shape shown in Fig. 3.

Like numerals of reference indicate corresponding parts throughout the figures.

Referring particularly to Fig. 1, the top of the buggy is indicated as 1, being supported by suitable supports and while some are shown, it is not thought necessary to refer particularly to the same, except the longitudinal brace 2 which extends along the side of the top 1, and is hinged at 3. The forward end of said brace is coupled or connected to the forward portion of the top, by being slipped over a threaded stud 4, and held in position thereon, by the nut 5, and the forward end of said brace 2, is provided with the opening therein, to enable the same to be slipped over the end of the threaded stud and held thereon substantially in the manner shown in Fig. 2.

The lamp holder or support which is shown enlarged in Fig. 3, is a rear view of a similar support which is shown in Fig. 1, being that support which is bent into form from a single piece of sheet metal and from a sheet metal plate substantially as shown in Fig. 4. When bent into form from a plate such as shown in Fig. 4, the same is provided with an opening 7 which enables it to be passed over and supported on the threaded stud 4, previously referred to, and also provided with the upright or vertical tubular stem portion 8, serving as a support for a lamp in a manner to be described, and extending at right angles to said upright or vertical portion 8, and parallel with the brace 2, is an extension 9, provided with the inturned lips 10 which are intended to partially embrace the brace 2 for securing the support on said brace, as will be understood.

After the support has been attached to the stud 4 in the manner previously described, and the lips 10 caused to embrace the brace 2, the nut 5 is connected with the stud 4 in the manner shown in Fig. 2, and said support thereby firmly held on said brace 2.

A portion of a suitable form of lamp is shown in Fig. 2, and is indicated as 12, and such a lamp is usually provided on opposite sides thereof, with a bracket 13 with overlying openings 14, through which it is intended that the lamp supporting portion, such as the modified form shown in Fig. 2 is to be inserted, and said support is secured in the bracket 13 in the following manner; a spring arm is indicated as 16 which may be secured to the body of the lamp in any desired manner, although I have shown the same riveted thereto, by one of the rivets which is used for securing the bracket 13 to the lamp, and to the forward portion of said spring arm, is suitably connected a stud 18, which is designed to pass through the opening 15 in the bracket 13, and one of a series of openings 17, shown more particularly in the lamp supporting portion of the support which is shown in Fig. 2.

The main object which I have in view with the present construction of lamp support, or such as I have previously described, is to provide a holder for supporting a lamp at the top and sides of a buggy or similar vehicle, so that the light from the lantern will be above and to one side of the driver's eyes and throw its rays farther in advance along the road than if supported lower. The support as described is simple in construction, convenient to attach and can be manufactured at small cost.

It will be observed that with a lamp support or holder connected with the forward portion of the upper horizontal braces extending longitudinally with the sides of the top of the vehicle, that even though a lamp be connected with said support or holder when the vehicle top was folded back, the brace 2, breaking at the joint, would cause the lamp to assume a position the same as when the top of the vehicle is in that position shown in Fig. 1.

Having thus fully described my invention what I claim and desire to secure by Letters Patent of the United States, is:—

1. A lantern holder for vehicles, comprising a support formed with integral vertical and horizontal portions and capable of being connected to the forward end of the upper horizontal brace of a vehicle top, said vertical portion of said support arranged for securing a lantern thereto, the horizontal portion of said support arranged to lie parallel with and adjacent to said horizontal brace of the vehicle, and means for securing said support at the junction of said vertical and horizontal portions, to said brace.

2. A lantern holder bent into form from a single piece of sheet metal, said sheet comprising right angle portions and at the juncture of said portions formed with an opening, one of said portions formed into a tubular body, while the other of said portions is formed with inturned securing lips.

In testimony whereof I affix my signature, in presence of two witnesses.

HENRY WALDSCHMIDT.

Witnesses:
ROBERT N. MCCORMICK,
LAURA E. CLAYPOOL.

Copies of this patent may be obtained for five cents each, by addressing the "Commissioner of Patents, Washington, D. C."